United States Patent
Taljanovic

(10) Patent No.: US 9,922,038 B2
(45) Date of Patent: Mar. 20, 2018

(54) MANAGEMENT OF FILE STORAGE LOCATIONS

(71) Applicant: International Business Machines Corporation, Armonk, NY (US)

(72) Inventor: Nedzad Taljanovic, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/943,707

(22) Filed: Nov. 17, 2015

(65) Prior Publication Data

US 2016/0070780 A1 Mar. 10, 2016

Related U.S. Application Data

(63) Continuation of application No. 13/863,801, filed on Apr. 16, 2013, now Pat. No. 9,286,304.

(51) Int. Cl.
*G06F 17/30* (2006.01)

(52) U.S. Cl.
CPC .. *G06F 17/30091* (2013.01); *G06F 17/30115* (2013.01); *G06F 17/30377* (2013.01); *G06F 17/30598* (2013.01)

(58) Field of Classification Search
CPC ................................................ G06F 17/30091
See application file for complete search history.

(56) References Cited

U.S. PATENT DOCUMENTS

| | | | |
|---|---|---|---|
| 6,542,972 B2 | 4/2003 | Ignatius et al. | |
| 6,574,716 B2 | 6/2003 | Dovi | |
| 7,496,605 B2 | 2/2009 | Sudhi et al. | |
| 7,849,141 B1 * | 12/2010 | Bellegarda | G06Q 10/107 707/665 |
| 7,899,831 B2 | 3/2011 | Drory et al. | |
| 8,065,351 B2 | 11/2011 | Rasmussen | |
| 8,180,747 B2 | 5/2012 | Marinkovic et al. | |
| 9,183,454 B1 * | 11/2015 | Ames | G06K 9/4604 |
| 9,189,491 B2 | 11/2015 | Fushman et al. | |
| 2005/0177576 A1 | 8/2005 | Ishikawa et al. | |
| 2007/0067353 A1 | 3/2007 | Cheng et al. | |
| 2007/0239636 A1 | 10/2007 | Tang et al. | |
| 2010/0094822 A1 | 4/2010 | Kelapure | |
| 2011/0119628 A1 | 5/2011 | Carter | |
| 2011/0173171 A1 | 7/2011 | De Meno et al. | |
| 2012/0092346 A1 | 4/2012 | Ording et al. | |

(Continued)

OTHER PUBLICATIONS

Bao et al., "Fewer Clicks and Less Frustration: Reducing the Cost of Reaching the Right Folder," IUI '06: Proceedings of the 11th International Conference on Intelligent User Interfaces, Jan. 2006, pp. 178-185, Copyright 2006 ACM. DOI: 10.1145/1111449.1111490.

*Primary Examiner* — Scott A. Waldron
(74) *Attorney, Agent, or Firm* — Joseph W. Cruz

(57) ABSTRACT

The embodiments described may be directed toward a file management system for managing a file folder location, a method for managing one or more data clusters, and a method of recommending a file storage location. The method of recommending a file storage location may also include plotting one or more data points onto one or more vectors. A received data point may be obtained from a file save request. The method may also include creating one or more data clusters from the vector data points using a clustering mechanism.

9 Claims, 8 Drawing Sheets

(56) References Cited

U.S. PATENT DOCUMENTS

2012/0221571 A1* 8/2012 Orman ............... G06F 17/3097
                                                     707/737
2013/0166614 A1   6/2013 Watanabe et al.
2014/0310279 A1  10/2014 Taljanovic

* cited by examiner

| FILE NAME | FILE SIZE | FILE TYPE | TIME CREATED | DESTINATION FOLDER |
|---|---|---|---|---|
| A.JPG | 100 B | .jpg | 1830 3/4/12 | C:\My Pictures |
| B.DOC | 10B | .doc | 0200 3/4/12 | C:\My Documents |
| ------ | ------ | ------ | ------ | ------ |
| C.gif | 200B | .gif | 0930 3/6/12 | C:\Work Projects |

MANAGEMENT OF FILE STORAGE LOCATIONS

FIELD

This disclosure generally relates to saving files, and in particular, to saving files in recommended locations.

BACKGROUND

Command line interface (CLI) and graphical user interface (GUI) based operating systems typically include a file system. A file system is a software and/or hardware based mechanism for storing and organizing computer files and the data they contain for easy and quick access and retrieval. A file system usually includes one or more folders in which files and other similar data are stored. Currently, a user may save a certain file to a storage device such as a hard disk or flash drive through the file system interface of CLI and/or GUI based operating systems. A user may also want to save a certain file to a cloud-based storage device.

Typically, the user specifies an existing folder of the file system in which to save the certain file when the user requests for an application such as a browser, a word processor, or any other similar application to save the file on to a storage device. If the user does not store the file to an existing folder, the user may also create a new folder in which to save the certain file. Additionally, the operating system may assume a default folder in which to save the file based on earlier preferences and present the default folder location to the user. Unfortunately, when an operating system does suggest a default folder, the folder location is typically the same default folder location for every save request regardless of the file type and/or the application.

SUMMARY

One embodiment may be directed toward a method of recommending a file storage location. The method may include receiving a file save request. The method may also include plotting one or more data points onto one or more vectors. A received data point may be obtained from the file save request. One or more vector data points may be obtained from a file system. The method may also include creating one or more data clusters from the vector data points using a clustering mechanism. The method may also include locating the closest data cluster to the received data point. The method may also include analyzing the data cluster closest to the data point for a majority destination folder. The method may also include recommending the majority destination folder for the file save request.

Another embodiment may be directed toward a method for managing one or more data clusters. The method may include reading data from one or more files in a source. The method may also include extracting one or more data points from the data in the file. The method may also include plotting the data point in a vector plot. The method may also include grouping the data point in the vector plot into the data cluster based on a correlation to another data point in the vector plot. The correlation may be at least partly determined by a clustering parameter. The method may also include updating or adjusting the data clusters when the clustering parameter of the clustering mechanism changes. The method may also include updating the data clusters when a new data point from a new file is added to the source.

Another embodiment may be directed toward a file management system for managing a file folder location. The system may have a file metadata with the capability of being read from a file save request for an incoming file. The system may also have a file system with the capability of saving the incoming file to a save folder. The system may also have an analyzer with the capability of creating one or more data points from the file metadata, grouping the data points into data clusters, locating a closest data cluster to the data point derived from the file save request, determining a majority destination folder for the closest data cluster, and selecting the majority destination folder as the save folder.

BRIEF DESCRIPTION OF THE DRAWINGS

Like reference numbers and designations in the various drawings indicate like elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, some of the described embodiments facilitate the selection of a folder in which to save a file associated with a file save operation by a user of a computer operating system. When a user-agent such as a web browser or an application such as a word processor prompts the user with a location in which to save a file, the user-agent or the application references an analyzer associated with the operating system. The analyzer may recommend to the user-agent or application a location in which to save the file automatically according to the data points associated with the file.

An aspect of the disclosure is the recommendation of a folder for saving a file. The recommendation may be generated by analyzing files in the memory or from an external database and extracting vector data points. The vector data points may have one or more attributes for properties such as a file size, or file extension. Each attribute may correspond to a particular vector, or axis, in a multidimensional plot. The vector data points may be analyzed and grouped into data clusters. A separate data point for a received file may yield a received data point which may be assigned to the data cluster. The data cluster may have a majority destination folder selected from one or more destination folders and this folder is recommended for the file corresponding to the received data point.

In an embodiment, there may be three or more scenarios where the disclosure is used. For example, the scenarios may include when a file is being saved from a network, e.g., the internet, local area network, when a working file, e.g., a document, is being saved from memory to a file system, or when a file is being saved in a file operation.

Figure 1:
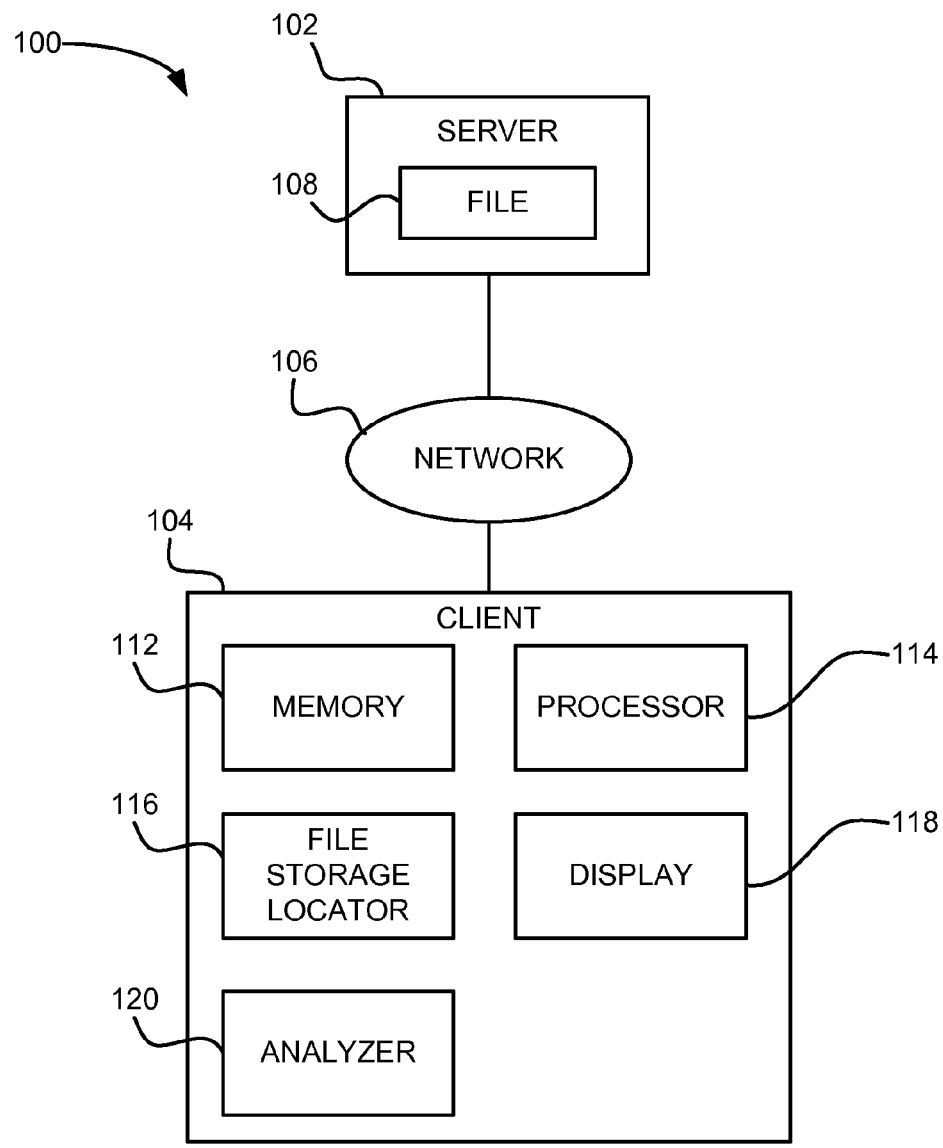
FIG. 1 illustrates a schematic block diagram of a computer system, according to various embodiments.

FIG. 1 depicts a schematic block diagram a computer system 100, according to various embodiments. As depicted, the computer system 100 includes a server 102, a network 106, and a client computer 104. Additionally, the server includes a file 108, which may be referred to as a received file in some embodiments. Additionally, the client computer 104 includes a memory device 112, a processor 114, a file storage locator 116, a display 118, and an analyzer 120 (further described in FIG. 4). The computer system 100 may allow a user to interface with the server 102. Although the depicted computer system 100 is shown and described herein with certain components and functionality, other embodiments of the computer system 100 may be implemented with fewer or more components or with less or more functionality. For example, some embodiments of the computer system 100 may not include a network 106 and a server 102. Hence, some embodiments of the computer system 100 include only the client computer 104 and the file 108 and may be generated and stored only on the client computer 104. Additionally, some embodiments of the computer system 100 may include a plurality of servers 102 and a plurality of networks 106. Additionally, some embodiments of the computer system 100 may include similar components arranged in another manner to provide similar functionality, in one or more aspects. In one embodiment, the server 102 is an array of servers. Additionally, multiple server instances may be run on a single server 102.

As depicted, the server 102 may host a particular application that the user may access through the client computer 104. By interfacing with the server 102, the user may access a file 108 associated with the particular application on the server 102. Although the computer system 100 depicts the file 108 on the server 102, in some embodiments, the file 108 generated by the user is generated on the client computer 104. Alternatively, in some embodiments, the application associated with the file 108 runs on the client computer 104 in conjunction with the memory device 112 and the processor 114 of the client computer 104.

The client computer 104 may connect an interface between the user and the server 102. In one embodiment, the client computer 104 is a desktop, or laptop computer. In other embodiments, the client computer 104 is a mobile computing device that allows a user to connect to and interact with an application running on the server 102 associated with the file 108. The client computer 104 connects to the server 102 via a local area network (LAN) or other similar network 106.

As explained above, in some embodiments, the user generates the file 108 on the client computer 104 in conjunction with the memory device 112 and the processor 114. In some embodiments, the memory device 112 is a random access memory (RAM) or another type of dynamic storage device. In other embodiments, the memory device 112 is a read-only memory (ROM) or another type of static storage device. In other embodiments, the illustrated memory device 112 is representative of both RAM and static storage memory within the computer system 100. Hence, the memory device 112 may store operations and functions associated with the generation of the file as well as a save operation to save the file to the memory device 112. In other embodiments, the memory device 112 is an electronically programmable read-only memory (EPROM) or another type of storage device. Additionally, some embodiments store the instructions as firmware such as embedded foundation code, basic input/output system (BIOS) code, or other similar code.

In one embodiment, the processor 114 is a central processing unit (CPU) with one or more processing cores. In other embodiments, the processor 114 is a graphical processing unit (GPU) or another type of processing device such as a general purpose processor, an application specific processor, a multi-core processor, or a microprocessor. Alternatively, a separate GPU may be coupled to the display device 118. In general, the processor 114 executes one or more instructions to provide operational functionality to the computer system 100. The instructions may be stored locally in the processor 114 and/or in the memory device 112. Alternatively, the instructions may be distributed across one or more devices such as the processor 114, the memory device 112, or another data storage device.

In one embodiment, the file storage locator 116 prompts the user with a location in which to save the file. The file storage locator 116 may reference an analyzer 120 associated with the operating system of the client computer 104. In some embodiments, the display device 118 is a graphical display such as a cathode ray tube (CRT) monitor, a liquid crystal display (LCD) monitor, or another type of display device. In one embodiment, the display device 118 is configured to visually communicate a potential file storage location on the memory device 112 based on analysis of the data from the analyzer 120.

In an embodiment, the client computer 104 may request to save the file 108 from the server 102. The client computer 104 may use the analyzer 120 to read the file 108 and other files contained in the memory 112. The analyzer 120 may further compare a property of the file 108 with the property of other files contained in the memory 112. The analyzer 120 may use statistical methods, e.g., clustering, to generate a recommended destination folder in the memory 112. The operation of the analyzer 120 may be further discussed in FIG. 4.

In some embodiments, the analyzer 120 analyzes the an attribute of a particular file, e.g., the time/date stamp, the location of the file on a server, a URL, file size, or file extension, to generate a recommended destination folder from one or more majority destination folders. Additionally, in some embodiments, the analyzer 120 may extract file information from files on the client computer 104 as well as remote files on networked hosts such as the server 102. The files can be simply members of a selected file system or part of a virtual web. The analyzer 120 may use the processor 114 resources, then store the analyzed data or a report on the memory device 112.

The network 106 may communicate traditional block input/output (I/O), such as over a storage area network (SAN). The network 106 may also communicate file I/O, such as over a transmission control protocol/internet protocol (TCP/IP) network or similar communication protocol. In some embodiments, the computer system 100 comprises two or more networks 106. Alternatively, the client computer 104 may be connected directly to a server 102 via a backplane or system bus. In one embodiment, the network 106 may include a cellular network, other similar type of network, or combination thereof.

Figure 2:
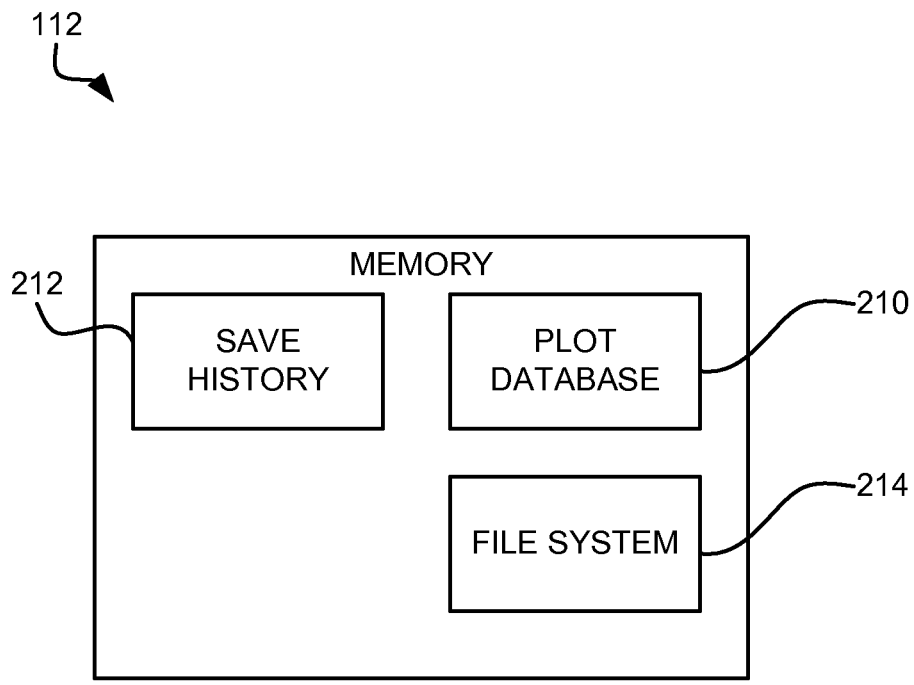
FIG. 2 illustrates a schematic block diagram of a memory device, according to various embodiments.

FIG. 2 depicts a schematic block diagram of the memory device 112, according to various embodiments. The memory device 112 may correspond directly to the memory device 112 of the client computer 102 depicted in the computer system 100 of FIG. 1. As depicted, the memory device 112 may have a plot database 210, a save history 212, and a file system 214. Although the memory device 112 is depicted as being associated with the client computer 104, in some embodiments, the memory device 112 and components thereof may be associated with the client computer 104 and/or the server 102.

In one embodiment, the plot database 210 is configured to contain one or more attributes of the file data from the received file 108 or file data that is part of previous file save operations. In one embodiment, the plot database 210 may be stored in the memory device 112. In another embodiment, the plot database 210 may be stored in the network 106 or on the server 102. The plot database 210 may serve as a repository for the different file data attributes. The plot database 210 may retrieve file data from any file stored on the client computer 104, according to an embodiment. In another embodiment, the plot database 210 may be restricted to received files 108 that are saved to the client computer 104 from the network 106. In another embodiment, the plot database 210 may use vector file data obtained from operation 514 in FIG. 5. The plot database 210 may be continuously updated in some embodiments. In other embodiments, the plot database 210 may have stale data removed. For example, the analyzer 120 may remove data that passes a time threshold of more than 4 years. In another embodiment, the analyzer 120 may remove data that was not accessed recently by a particular user. In another embodiment, the analyzer 120 may be configurable by the user.

In one embodiment, the save history 212 includes a file storage location of at least one previous save operation of a stored file. The user may save a file that was saved between the hours of 0900-1000 in the folder named "work projects." Thus, the save history 212 includes the time of the file and the folder location where the file is saved by the client computer 104. Additionally, the save history 212 may include other file properties such as a name of the application used by the user to generate the file, the user that downloaded the file, a unified resource locator (URL) associated with the file, metadata associated with the file, metadata associated with the folder in which the file is stored, file size, and file extension and other similar file properties. In some embodiments, the save history 212 may be configured to be used by the analyzer 120.

In one embodiment, the file system 214 is a software and/or hardware mechanism to store and organize electronic content, such as files and data stored in the files on the memory 112. The file system 214 generally allows a user to find, search for, and access the files stored on the storage device. Hence, in general, the file system 214 is a database for the storage, hierarchical organization, manipulation, navigation, access, and retrieval of files and data associated with the files. The file system 214 may include a disk file system, a flash file system, a database file system, a transactional file system, a network file system, and other similar file systems. The file system 214 may access data from a data storage device such as a hard disk or compact disk read only memory (CD-ROM) and involve the maintenance of the physical locations of the files. Additionally, the file system 214 may include access to data on a file server such as the server 102 of FIG. 1 by acting as a client for a network protocol. Additionally, the file system 214 may include a virtual filing system such as a process file system (procfs).

As explained above, the analyzer 120 may extract metadata from files stored on the client computer 104. The analyzer 120 may further organize the extracted metadata to derive the plot database 210 stored on the memory device 112.

Figure 3:
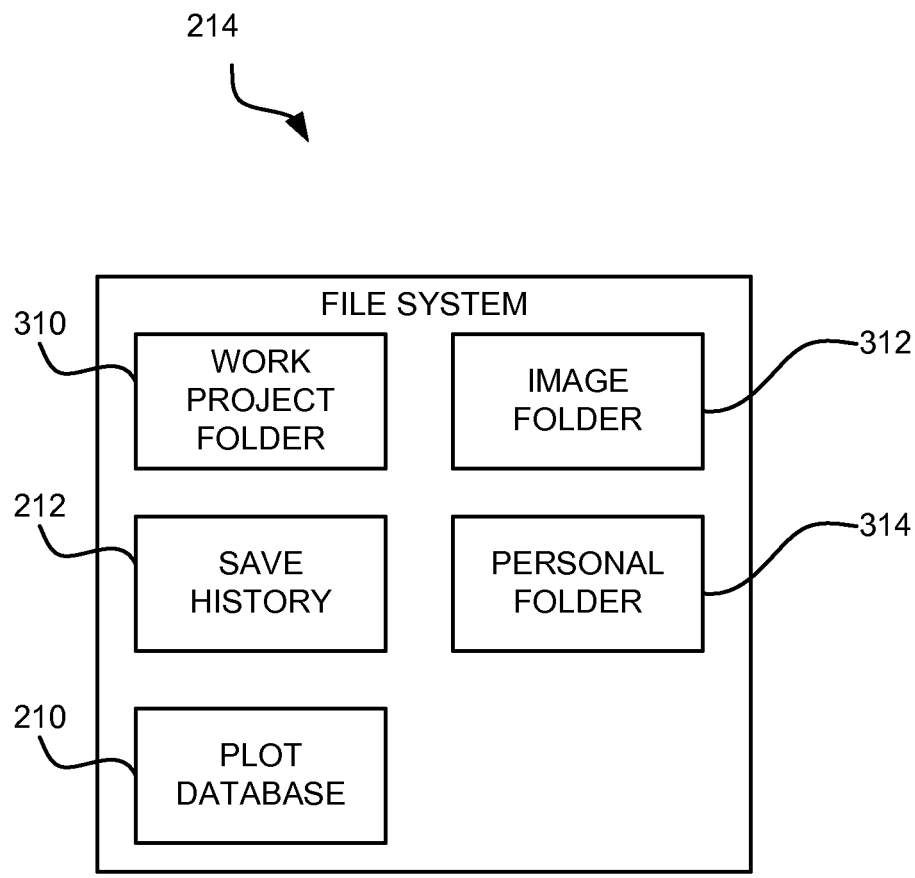
FIG. 3 illustrates a schematic block diagram of a file system, according to various embodiments.

FIG. 3 depicts a schematic block diagram of a file system 214, according to various embodiments. The file system 214 may correspond to the file system 214 of FIG. 2. As illustrated in FIG. 3, the file system 214 includes a number of folders such as a work projects folder 310, an image folder 312, and a personal folder 314. Although FIG. 3 depicts the file system 214 with three distinct folders, the file system 214 may include any number of folders or subfolders. For example, if the folder is titled work, then a subfolder may include a folder for work benefits. In a further embodiment, the file system 214 may optionally hold the plot database 210 or save history 212 of FIG. 2. The file system 214 may use any number of techniques to hold the plot database 210 or save history 212, such as a page file or a temporary file storage such as a cache.

A user may create other types of folders, e.g., a document folder, a music folder. The three folders of FIG. 3 represent three possible folders that the user may create within the file system 214 of the client computer 104. In an embodiment, the user may store any file related to work projects to the work project folder 310. Likewise, the user may store any file related to images and digital photographs in the image folder 314, etc. The depicted folders 310, 312, and 314 may include metadata related specifically to each folder. For example, metadata of the image folder 134 may include the name of the image folder 134, data types stored in the image folder such as bitmap (.bmp) and joint photographic experts group (.jpg), names of files stored in image folder 134, and so on.

Figure 4:
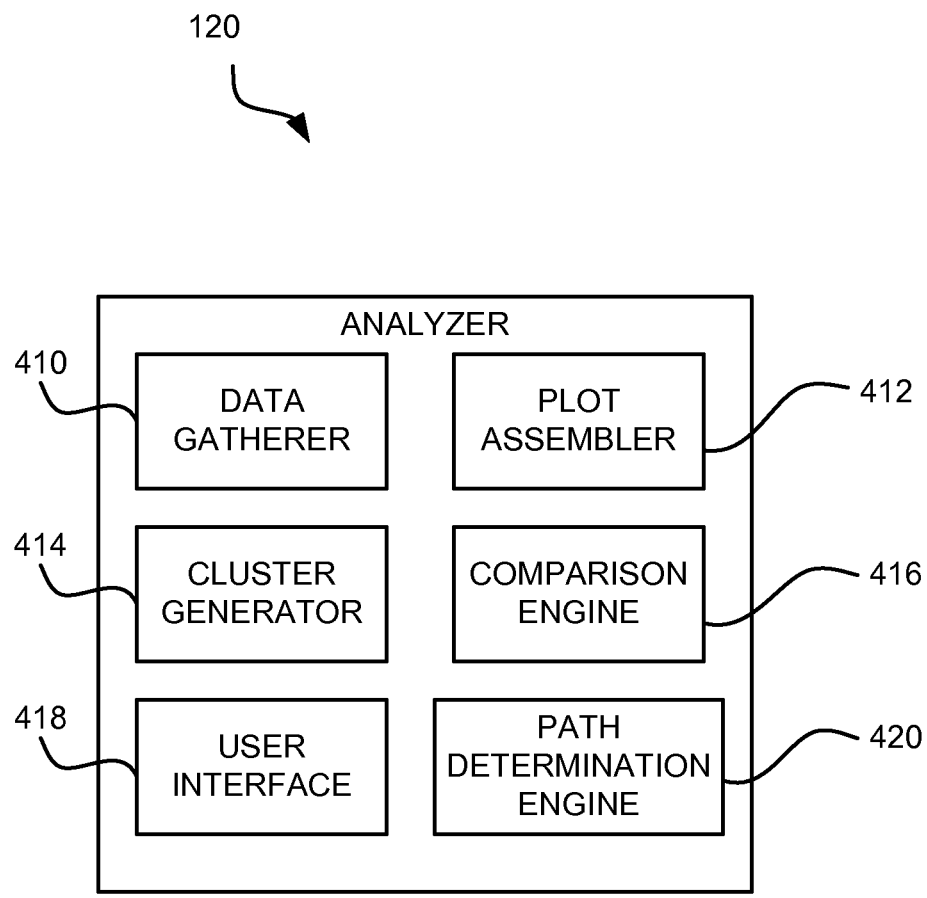
FIG. 4 illustrates a schematic diagram of an analyzer, according to various embodiments.

FIG. 4 depicts a schematic diagram of an analyzer 120, according to various embodiments. The analyzer 120 may correspond to the analyzer 120 of the client computer 104 connected to the computer network system 106 of FIG. 1. As shown, the analyzer 120 includes a data gatherer 410, a plot assembler 412, a cluster generator 414, a comparison engine 416, a user interface 418, and a path determination engine 420.

In one embodiment, the data gatherer 410 is configured to extract and organize metadata in the file that the analyzer 120 may use in response to a save operation to save the file 108 on the storage device of the client computer 104 such as the memory device 112. In some embodiments, the data gatherer 410 is configured to read a property of the file associated with the save operation. The data obtained by the data gatherer 410 may be stored in the memory 112, particularly in the plot database 210, in some embodiments. In another embodiment, the data obtained by the data gatherer 410 may be stored in a temporary configuration, e.g. a page file in the file system 214, or a cache in the memory 112, or in a separate database on the server 102. The data gatherer 410 may gather data in either an incoming file, e.g., file 108, or a file contained in the file system 214.

In one embodiment, the plot assembler 412 may be configured to create plot diagrams from one or more vectors. The vector may be a file property obtained from the data gatherer 410, e.g., the time the file was created. A data point may contain an attribute that corresponds to a vector. One or more vectors may be assembled by the plot assembler 412 in order to create multidimensional plot diagrams in an embodiment. The plot assembler 412 may use data, i.e., attributes, from the incoming file 108 or from another source, e.g., a file contained in the file system 214 or the plot database 210. In another embodiment, the plot assembler 412 may cache data in the memory 112, particularly in the plot database 210. The coordinates of file data from previously saved files may be referred to as a vector data point, according to an embodiment. The coordinates of file data from the received file 108 may be referred to as a received data point or a new data point, according to an embodiment.

In one embodiment, the cluster generator 414 may be configured to analyze the data on the plot diagram created by the plot assembler 412. The cluster generator 414 may group similar data points together based on the properties in the file data (further described in FIG. 7). The grouping may be referred to as a data cluster. In some embodiments, the cluster generator 414 may use a clustering mechanism, or a database tool, e.g., DBSCAN.

In one embodiment, the comparison engine 416 may be configured to compare the data, e.g., metadata or URL, from the file 108 to one or more data clusters from the cluster generator 414. The file data from the file 108 may be plotted, which may also be referred to as the received data point, according to an embodiment. In another embodiment, the distance of the received data point to the data cluster may be measured by the comparison engine 416 and compared to each other distances with other data clusters. In some embodiments, the received data point may be part of a data cluster. If the received data point is part of the data cluster, then the data cluster is the nearest data cluster in the multi-dimensional plot space (described further in FIG. 7).

In one embodiment, the user interface 416 may be configured to allow a user to create a new data point and to save the new data point in the plot database 210. Additionally, the user interface 416 may be configured to allow a user to modify an existing data point previously stored in the plot database 210 and to save the modified data point in the rule database 210. In one embodiment, the path determination engine 420 may be configured to examine all the data points within a data cluster and determine whether a majority destination path exists (further described in FIG. 6).

Figure 5:
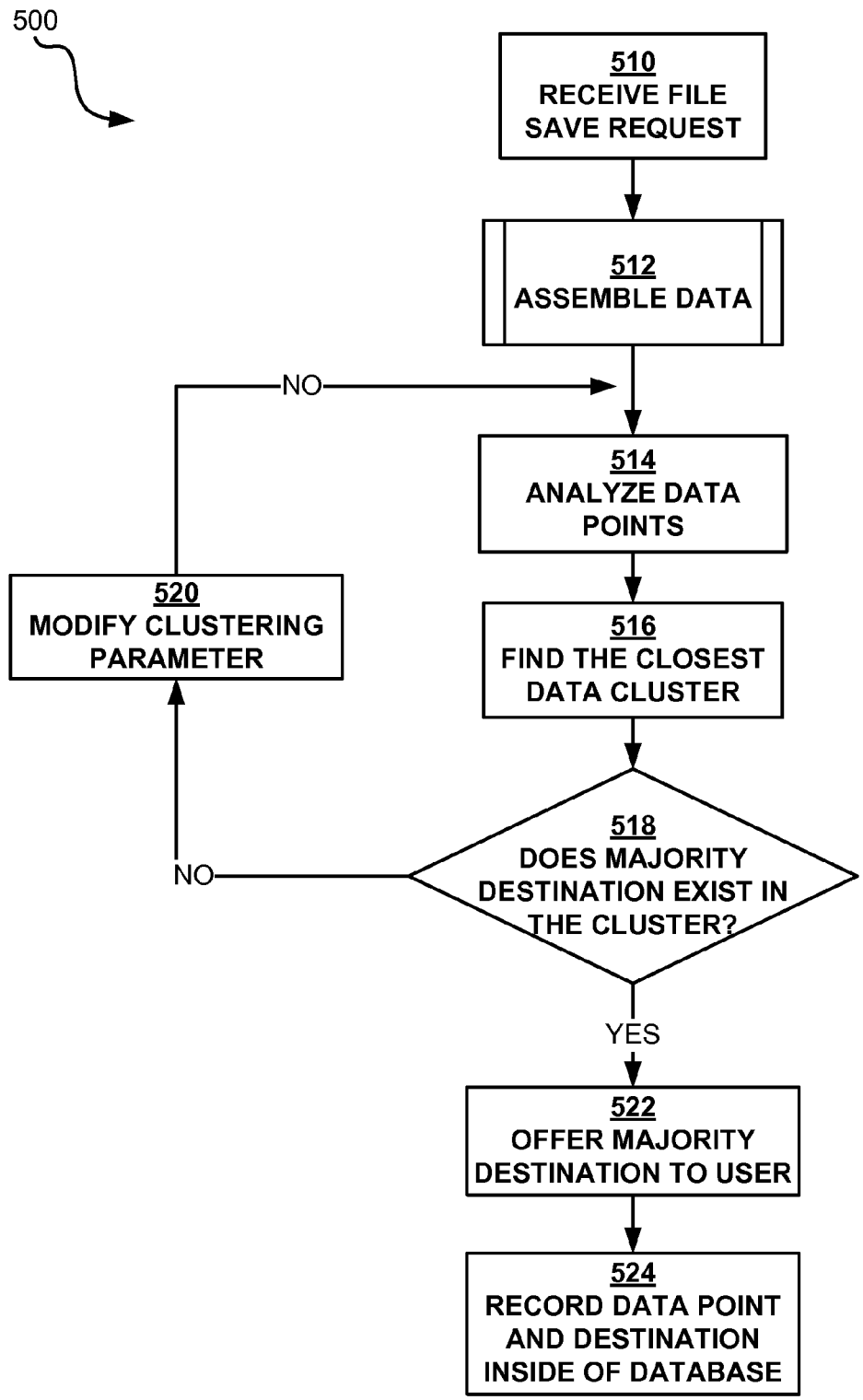
FIG. 5 illustrates a flowchart of a method for determining a default file folder, according to various embodiments.

FIG. 5 depicts a flowchart of a method 500 for determining a default file folder, according to various embodiments. The method may begin with operation 510. In operation 510, the client computer 104, network 106, or server 102 may receive a file save request. The file save request may be a request by the client computer 104 to save a file into the file system 214, according to an embodiment. The file save request may be received by the operating system of the client computer 104, according to an embodiment. The file save request may have basic file information for a received file, e.g., time that file was created, the name of the file, file size, file type, serving host (if applicable), or the time that the file was received. Received file data, e.g., metadata, associated with the file save request may be read before the received file is received by the client computer 104, according to an embodiment. In another embodiment, the file save request may be received into a cache on the memory 112 prior to being read. After the file save request is received, the operation may proceed to operation 512.

In operation 512, analyzer 120, or more specifically, the data gatherer 410, may extract data points for the received file data from the received file 108. The data points may be plot on a vector graph by the analyzer 120, or more specifically the plot assembler 412, in an embodiment. Operation 512 may be further described on FIG. 6. Operation 512 may occur by the analyzer 120 of the client computer 104 or the server 102. After the received file data is prepared in operation 512, the data points may be analyzed in operation 514.

In operation 514, the clustering of the data points, e.g., the vector data points, may occur. During clustering, the analyzer 120, or more specifically, the cluster generator 414, may group vector data points that are most similar in the multidimensional space. The vector data points may be obtained from the plot database 210 stored in the memory 112, according to an embodiment. The plot database 210 is further explained in FIG. 8.

In some embodiments, the received file attributes are analyzed to determine the vectors. The received file may modify the vector data points For example, if the received file only contains an attribute for URL because it is downloaded from the network 106, but only some of the vector data points obtained from the file system have an attribute for URL, then the analyzer 120 may assign zero values for the vector data points that do not have URL attributes. In other embodiments, any number of vectors may be measured and the vectors may also include semantic relationships. The clustering may occur using a variety of different methods, e.g., DBSCAN, or a clustering mechanism (discussed below). The clustering is further discussed in FIG. 7. After analyzing the vector data points obtained from operation 512, the received data point may be compared to the vector data points in operation 516. The data clusters may be continuously updated as new vector data points are received, according to an embodiment. The data clusters may also be updated when a clustering parameter (discussed below) is modified.

In operation 516, the analyzer 120 may examine the data clusters and plot the received data point associated with the file save request in operation 510. The analyzer 120, or more specifically, the comparison engine 418, may then find the data cluster with the strongest relationship to the received data point. In some embodiments, the strongest relationship to the received data point may be defined by a distance on a plot. In other embodiments, the strongest relationship may be defined by a relative association. For example, the received data point may have an extremely high correlation for vector A, but not vector B. In the above example, vector A may outweigh the vector B. After the closest data cluster is found in operation 516, the operation may proceed to operation 518.

Figure 7:
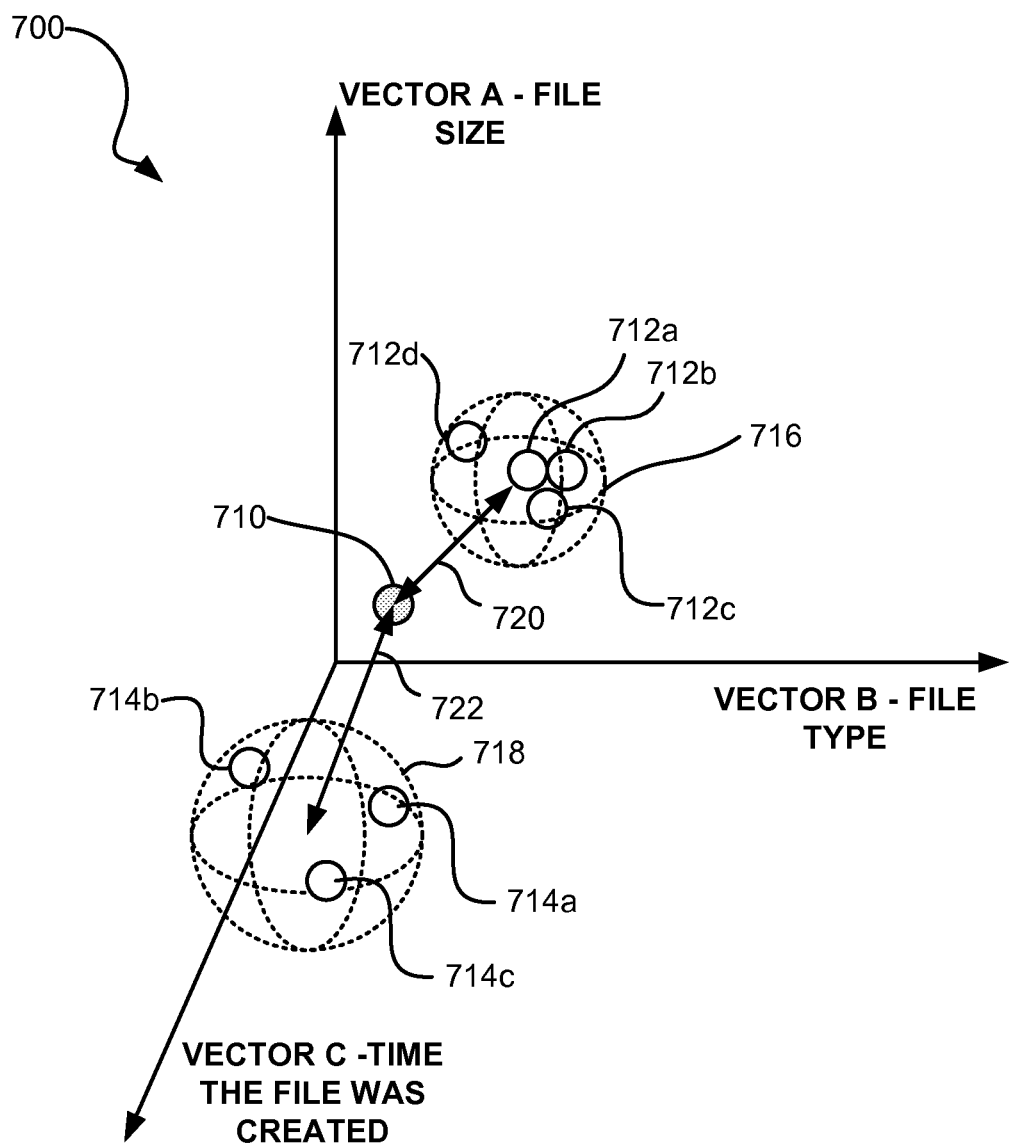
FIG. 7 illustrates a plot diagram of a vector plot for analyzing clusters of vectors, according to various embodiments.

In operation 518, the analyzer 120, or more specifically, the path determination engine 420, may examine the destination folders of the vector data points in the data cluster (described further in FIG. 7). All data points may have a destination folder. In some embodiments, the data points without a destination folder may be removed prior to clustering. The majority destination may be chosen from one or more destination folders. The analyzer 120 may then determine if there is a majority destination folder for the closest data cluster. In one embodiment, the majority destination may be determined by the most destination folders within the data cluster. For example, if fifty vector data points exist in the data cluster, and twenty-three of the vector data points are directed to the media folder, and thirteen of the vector data points are directed to the images folder, then the majority destination folder may be the media folder even if there is not an overwhelming majority.

In another embodiment, a majority destination may exist if the there is only an overwhelming majority of vector data points going to the destination folder. In the aforementioned example, a majority destination folder would not exist but would exist if forty of the data points go to the media folder. The number required for overwhelming majority may be configured by the user according to some embodiments. In other embodiments, the majority destination folder exists if there is a higher probability that any particular vector data point in the cluster corresponds to a specific destination folder. The determination of the majority destination folder may depend on an absolute number or a proportion of destination folders to total folders, according to an embodiment. If there is no majority destination folder in the data cluster, then the method may be determined to have one or more minority destination folders and the method 500 may proceed to operation 520. A minority destination folder may exist if there is no clear majority destination of the folders. If there is a majority destination in the data cluster, then the method 500 may proceed to operation 522.

In operation 520, the clustering parameter of the clustering mechanism (discussed in FIG. 7) may be modified or updated. In some embodiments, the clustering parameter may be customized by a user or user-customizable. In some embodiments, the threshold for becoming a data cluster may be increased to allow for a larger data set. For example, increasing the threshold may improve the determination of a majority destination if the data points have no particular majority destination folder. In other embodiments, the threshold for becoming a data cluster may be reduced to allow for a smaller and more concentrated data set. After operation 520, the method 500 may resume at operation 514.

In operation 522, the client computer 104 may offer the majority destination folder for the received file to the user. In some embodiments, the destination folder may be offered to the user through the display 118 such as the GUI. The user may be presented with the choice of one or more majority destination folders or a majority destination folder followed by one or more minority destination folders. The minority destination folders may be selected from the destination folders that are not majority folders. The folder that the file is saved into may be user-selected, i.e., selected by the user. The selection of the user may override the recommendation of the majority destination folder. In another embodiment, the recommendation of the majority destination folder may override the selection of the user. The selection of the user may be recorded in the file storage locator 116, according to an embodiment. In another embodiment, the selection of the user may be incorporated into an additional vector, according to an embodiment. In another embodiment, the selection of the user may be incorporated into the plot database 210, even if the user does not select the recommended folder.

In another embodiment, operation 522 may be omitted and the majority destination folder is automatically saved into by the client computer 104. After the majority destination folder is offered to the user, then the method 500 may proceed to operation 524.

In operation 524, one or more attributes of the received file data may be recorded from the received data point to the file system 214, e.g., the plot database 210. An example of an attribute may include, e.g., a 100 byte file size, or a specific destination folder. In this example, the 100 byte file size may be plotted along a file size vector. The plot database 210 may incorporate the received data points and may further be used in future iterations of operation 514.

Figure 6:
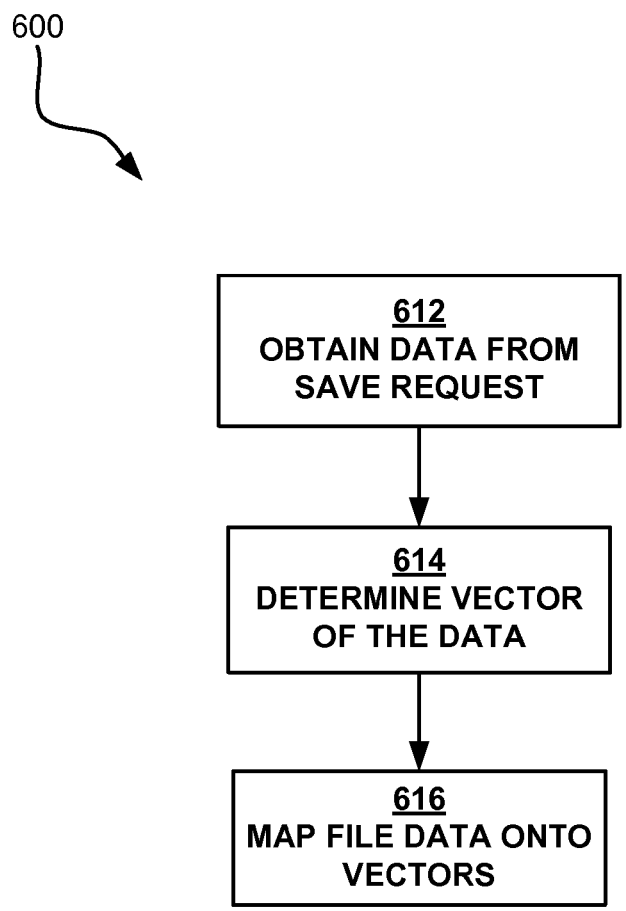
FIG. 6 illustrates a flowchart of a method for preparing data from the received file for analysis, according to various embodiments.

FIG. 6 depicts a flowchart of a method 600 for preparing data from the received file for analysis, according to various embodiments. Method 600 may correspond to a subprocess of operation 512 in FIG. 5, according to an embodiment. The method 600 may begin at operation 612, where received file data, e.g., metadata, from the save request is obtained. In an embodiment, the attributes from the received file may be read before the received file is saved by the client computer 104. In other embodiments, the file may be saved into a cache or temporary storage within the memory before the file metadata is read. After the attribute is obtained from the save request, the operation may proceed to operation 614.

In operation 614, the analyzer 120 may determine one or more vectors of the received file data. For example, during the file save request, attributes regarding the time that the received file was created, and the type of file may be scanned. The analyzer 120 may determine that the time created attribute for the received file corresponds to a time vector and the type of file attribute corresponds to a file type vector. In some embodiments, the contents of the file may be used to approximate what the entire file contains. For example, the first one thousand words of a text file may be analyzed to determine the likely topic of the file. In an embodiment, the analyzer 120 may read the particular vector from files other than the received file 108, including files on the client computer 104 from previous save operations. Operation 614 may also involve the conversion of the received file data to received data points or the files from previous save operation to one or more vector data points on a vector plot (further described on FIG. 7). Once the vectors are determined, the method 600 may proceed to operation 616.

In operation 616, the file data from files on the client computer 104 may be mapped onto the vectors as vector data points. During operation 616, the received file data may also be mapped onto vectors as received data points. Using the above example, the time the received file was created may be mapped onto that particular vector while the received file type may be mapped onto another particular vector. The vectors may be loaded with vector file data obtained from reading existing files on a client computer 104 or may be loaded from an external source such as an external database or the server 102. The method 600 may proceed to an analysis operation, e.g., operation 514 in FIG. 5.

FIG. 7 depicts a plot diagram of a vector plot 700 for analyzing clusters of vectors, according to various embodiments. The vector plot 700 may be created in the analysis operation, e.g., operation 514 in FIG. 5. In some embodiments, the vector plot 700 may be notional and is not required to be displayed on the display 118 to the user. The vector data points may be incorporated in a vector plot 700 after file data is translated into vector data points. The vector plot 700 may have three vectors; vector A, vector B, and vector C in a three-dimensional vector plot 700 configuration. In another embodiment, there may be more than three vectors or less than three vectors. In an embodiment, vector A may represent file size, vector B may represent a file type, and vector C may represent the time a file was created.

A received data point 710 may be received from an analyzer 120 in a preparation operation, e.g., operation 512 in FIG. 5. The received data point 710 may be plotted along one or more vectors, in an embodiment. Vector data points 712a, 712b, 712c, 712d, 714a, 714b, and 714c may represent one or more data points obtained from the plot database 210, or, e.g., obtained by the client computer 104 reading files from an external storage or from the memory 112.

In an embodiment, the vector data points 712a, 712b, 712c, and 712d may be grouped in a cluster 712 using a clustering mechanism. The clustering mechanism may be used to group the vector data points 712a, 712b, 712c, and 712d into a cluster 712, in an embodiment, similar to in operation 514. As mentioned, the clustering mechanism may be a set of instructions for the client computer 104 to assemble one or more vector data points on the vector plot 700 into one or more clusters. The assembly of the vector data points into cluster may be driven by the concentration of vector data points relative to each other. In one embodiment, the clustering mechanism is contained in a separate analysis program, e.g., DBSCAN. More than one cluster may be present in the vector plot 700. The vector plot 700 may also include grouping vector data points 714*a*, 714*b*, and 714*c*. into cluster 714

The clustering mechanism may use statistical relationships using a clustering parameter. In the shown example, two clustering parameters, 716 and 718, are shown on the vector plot 700. Each clustering parameter, 716, 718 may be defined by the user, i.e., user-customizable, or the clustering mechanism. In the shown embodiment, the clustering mechanism has equal weight to each vector (forming a sphere in a three-dimensional plot). However, in other embodiments, the clustering mechanism may give different weights to each vector. The clustering parameters, 716, 718, may be reduced or increased depending on need. For example, if the received data point 710 is equidistance to two clusters, then there may be no relationship with any cluster. Therefore, the clustering parameter may be increased to allow the received data point 710 to be in a data cluster 712.

After assembling the vector data points into clusters, e.g., 712*a*, 712*b*, 712*c*, and 712*d* into cluster 712, the distance from the received data point 710 to a particular cluster may be measured and the closest cluster may be determined. For example, the analyzer 120 may measure the distance from received data point 710 to the cluster 712, shown as 720, and from the received data point 710 to the cluster 714, shown as 722. Since 722 is further from 710 than 720, then the analyzer 120 may determine that the closest cluster to data point 710 is cluster 712. Even though the measurement is shown from the midpoint of the clusters 712, 714 using the clustering parameters 716, and 718, other configurations are imagined and may be customized by the user. For example, since cluster 714 has a lower correlation than cluster 712, then the user may select to measure the distance 722 from the outer edge of the clustering parameter 718 instead of the midpoint. The measuring may correspond to operation 516 in FIG. 5.

The analyzer 120 may monitor the folder destination of the files in the cluster, e.g. the destination folders of the vector data points 712 within a cluster. If the majority destination of the vector data points 712 does not exist, then the clustering parameters, 716, 718, may be modified which may correspond to operation 520 in FIG. 5.

Figure 8:
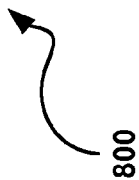
FIG. 8 illustrates a plot database derived from analyzing files, according to various embodiments.

FIG. 8 illustrates a table of file attributes that may be found on the plot database 210, according to various embodiments. In this example, the plot database 210 contains one or more attributes for the vectors: file name, file size, file type, time created, and destination folder. In some embodiments, the plot assembler 412 may read information from the plot database 210 to assemble the vector plot 700 found in FIG. 7.

Additionally, the plot database 210 may include associations between a property of a stored file that is stored on the client computer 104. In one example, the plot database 210 may include a file name, the file type, and the time the file was created. These file properties may be associated with the file folder location in the file system 214. In another example, the plot database 210 may include an association of a time that the stored file was generated, e.g., between the hours of 0900-1000, with a folder named "work projects."

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer usable or computer readable storage medium can be any apparatus that can store the program for use by or in connection with the instruction execution system, apparatus, or device.

The computer-useable or computer-readable storage medium can be an electronic, magnetic, optical, electromagnetic, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/Write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which may provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing one or more data clusters, comprising:
   reading file data from one or more files from a folder in a source the file data includes metadata that is associated with the file data and is specific to the folder;
   extracting one or more data points from the file data in the file;
   plotting the data point in a vector plot, wherein the vector plot uses two or more vectors, a vector represents a particular property of the file data;
   grouping the data point in the vector plot into a data cluster based on a correlation to another data point in the vector plot, wherein the correlation is at least partly determined by a clustering parameter;

updating the data cluster when the clustering parameter of the clustering mechanism changes, wherein the clustering parameter is based on a relationship between the data point and the data cluster, the clustering parameter changes based on a change in a weight of a vector in the vector plot, wherein the change in a weight of a vector causes the data cluster to change shape in the vector plot;

updating the data cluster when a new data point from a new file is added to the source, wherein the new data point is derived from attributes of the new file;

locating a first closest data cluster to the new data point;

analyzing the first data cluster closest to the new data point for a majority destination file folder; and in response to a file save operation request by a user of a computer operating system, recommending the majority destination folder to save the new file to based at least on assigning each of the one or more data points and the new data point to a destination folder and determining that a majority of the one or more data points are assigned to the majority destination folder.

2. The method of claim 1, wherein the source is a file system.

3. The method of claim 1, wherein the extracting one or more data points includes:
   recording one or more attributes from the file into a source, the one or more attributes including a time stamp attribute, and a location of the one or more files on a server; and
   determining the vectors of the attributes.

4. The method of claim 3, wherein the source is a plot database.

5. The method of claim 1, wherein the clustering parameter is user-customizable, and wherein the method includes:
   presenting the user with a choice of a plurality of majority destination folders and one or more minority destination folders to save the file data to;
   recommending, to the user, the two or more of the plurality of majority destination folders; and
   receiving, from the user, a selection request for the one or more minority destination folders.

6. The method of claim 1, wherein the one or more data points corresponds to a plurality of attributes, the plurality of attributes including: a time stamp, a location of the one or more files on a server, a URL, a name of the one or more files, a size of the one or more files, and a file type of the one or more files.

7. The method of claim 1, wherein the one or more data points are a plurality of data points, each of the plurality of data points having a destination folder, wherein there is a plurality of destination folders, the majority destination folder being included within the plurality of destination folders, and wherein the recommending a majority destination folder includes:
   identifying a plurality of names for each of the plurality of destination folders for the plurality of data points within the data cluster;
   determining that a first name of the plurality of names occurs most frequently within the data cluster; and
   selecting the majority destination folder based on the determining that a first name of the plurality of names occurs most frequently, wherein the majority destination folder has the first name.

8. A method for managing one or more data clusters, comprising:
   receiving a file save operation request by a user of a computer operating system;
   reading, in response to the receiving the save operation request, file data from one or more files from a folder in a source, the file data includes metadata;
   extracting a plurality of data points from the file data in the file;
   plotting, in response to the extracting a plurality of data points from the file data, the plurality of data points of the file in a multidimensional vector plot, each data point of the plurality of data points of the file being represented as a vector in the multidimensional vector plot, each vector of the multidimensional vector plot representing a different axis, at least some vectors of the multidimensional vector plot representing the metadata of the file;
   grouping the each vector in the multidimensional vector plot into a data cluster based on a correlation to another vector in the multidimensional vector plot, wherein the correlation is at least partly determined by a clustering parameter;
   identifying a destination folder for the each vector of the multidimensional vector plot, wherein there is a plurality of destination folders associated with the data cluster; and
   selecting a majority destination folder of the plurality of destination folders to save the file data to based on the identifying a destination folder for the each vector of the multidimensional vector plot.

9. The method of claim 8, wherein each vector in the multidimensional vector plot has equal weight, wherein the data cluster is substantially spherical.

* * * * *